(No Model.)
H. EASTMAN.
CULTIVATOR.
No. 496,727. Patented May 2, 1893.
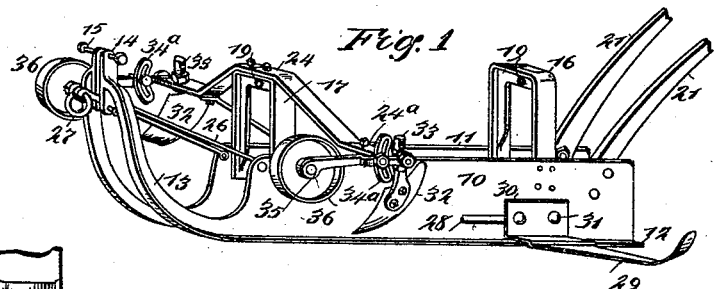
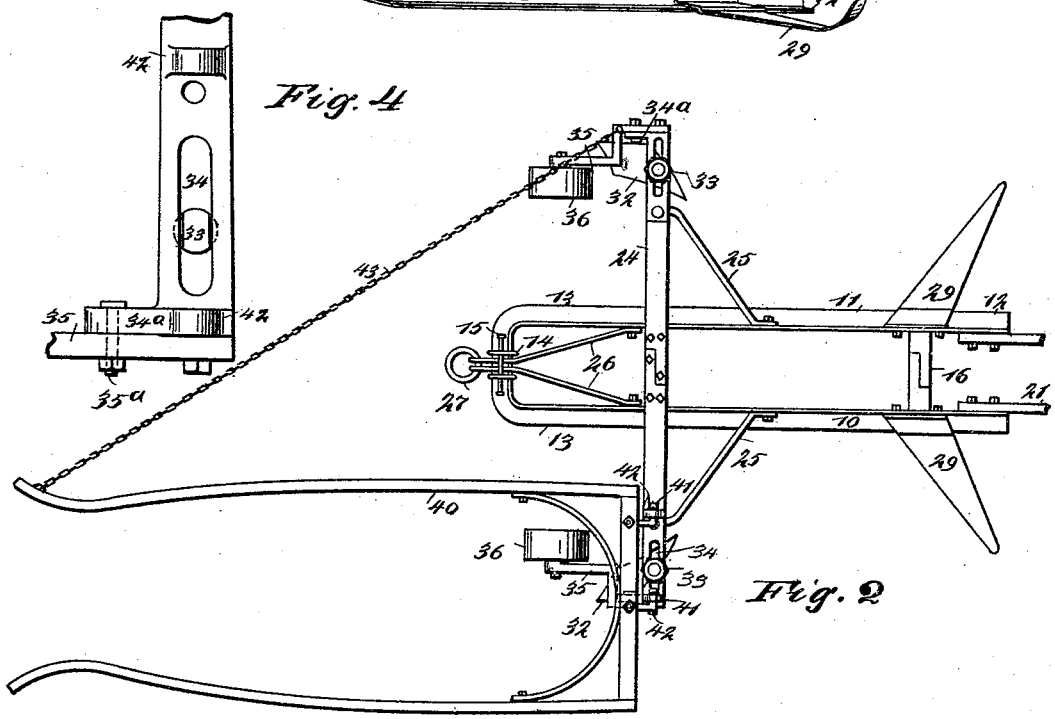
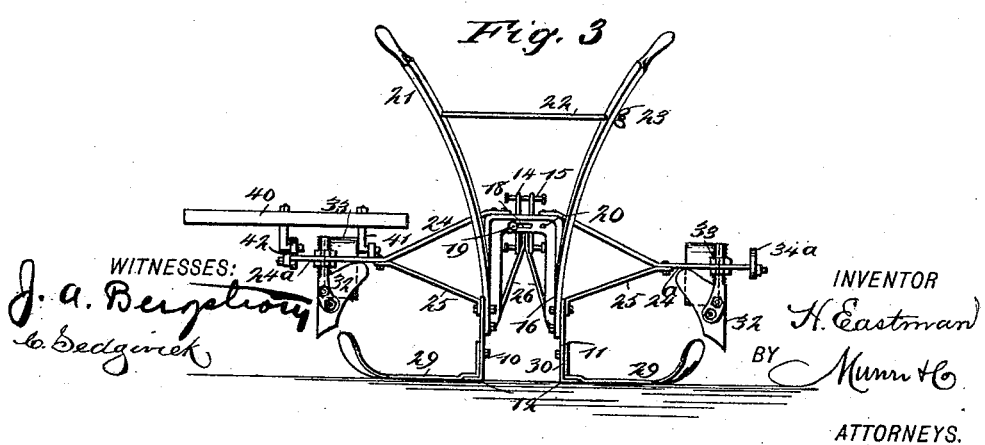
WITNESSES:
J. A. Bergstrom
C. Sedgwick
INVENTOR
H. Eastman
BY Munn & Co
ATTORNEYS.

UNITED STATES PATENT OFFICE.

HENRY EASTMAN, OF RACINE, WISCONSIN.

CULTIVATOR.

SPECIFICATION forming part of Letters Patent No. 496,727, dated May 2, 1893.

Application filed January 31, 1893. Serial No. 460,283. (No model.)

*To all whom it may concern:*

Be it known that I, HENRY EASTMAN, of Racine, in the county of Racine and State of Wisconsin, have invented a new and useful Improvement in Cultivators, of which the following is a full, clear, and exact description.

My invention relates to an improvement in cultivators, and it has for its object to provide a cultivator adapted for use in working listed corn, and a further feature of the invention is to provide a cultivator which will be supplied with runners to protect the corn, shovels which will tear down the ridges, and cutters capable of removing all weeds from the rows and of directing the loosened earth in direction of the runners and consequently in direction of the rows of plants.

Another feature of the invention consists in providing a means whereby the runners may be expeditiously and conveniently adjusted to and from each other, and whereby the shovels may be adjusted either laterally or vertically, and also to provide adjacent to the shovels balance rollers adapted to travel upon the ridge acted upon by the shovels, which balance rollers also serve to preserve the equilibrium of the machine.

Another feature of the invention is to provide a means whereby either a team or a single horse may be connected with the machine to draw it.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a perspective view of a cultivator, illustrating it as adapted to be drawn by a team. Fig. 2 is a plan view of the cultivator, in which view a pair of shafts is illustrated as connected therewith, allowing the application of a single horse thereto. Fig. 3 is a rear elevation of the cultivator as illustrated in Fig. 2; and Fig. 4 is a detail plan view of the construction of the front beam of the cultivator when shafts are to be used.

In carrying out the invention two runners 10 and 11 constitute the main portion of the main frame of the machine. These runners are placed parallel, and are provided at their lower ends upon their outer faces with horizontal flanges 12, the flanges engaging with the ground. The runners at their forward ends are provided with upwardly-curved arms 13, and the arms in addition to being curved upwardly are at their inner extremities curved inwardly, and are each provided with a vertical head 14, as shown in Fig. 1, the curvature of the arms being such as to bring the heads thereof quite close together. The head portions of the runners have passed loosely through them a pin 15, which pin is enlarged at each end in order that it may not be disengaged from the heads. The pin 15, is quite long in order to admit of the runners being adjusted close together or a predetermined distance apart. The body portions of the two runners are connected by two arches, designated in the drawings as 16 and 17, one arch being located at the rear and the other approximately at the front. These arches are made in two sections, and a connection between the sections is made at their upper or horizontal members. The connection and attachment are effected by producing in said members slots 18, as shown in Fig. 3, and passing a bolt 19 through said slots, the bolt being provided with suitable nuts, while a second bolt 20, may be passed through apertures in the said upper members of the sections of the arches or yokes, as shown in said Fig. 3, in order that when the sections have been adjusted they may be firmly connected.

Two handles 21, are connected with the rear ends of the runners at their upper portions, and these handles are curved rearward and outwardly in opposite directions, as shown in Fig. 3, the handles being connected by a tie rod 22, provided at one end with a thumb nut 23 or the equivalent thereof. Thus the distance between the handles may be adjusted to correspond to the adjustment of the runners.

The forward arch 17 is adapted to support a cross head 24, and this cross head is usually made in two sections, each section being connected with a section of the said forward arch, as is clearly shown in plan view in Fig. 2. The cross head is attached to the upper outer face of the forward arch, and inclines downwardly and outwardly from each side to a point considerably outside of the runners, and from that point the cross head is made straight or purely horizontal, the horizontal section being designated as 24ª. In order that the cross head, since it is made in two sections, may be thoroughly braced and strengthened, brace rods 25, are connected with the said cross head where the inclined sections intersect with the outer horizontal section, and the said braces 25, are likewise secured to the outer faces of the runners. The construction above set forth constitutes what may be termed the body of the machine.

When the machine is to be drawn by a team of horses two arms 26, are projected forwardly from the upper forward edges of the main or body portions of the runners and outwardly beyond the runners, the arms passing through the heads 14, as shown in both Figs. 1 and 2; and the arms at their outer ends are connected by a pin which carries a link 27, or the equivalent thereof, with which link the doubletree is connected. Each runner between its center and its rear end is provided with a horizontal slot 28; and at the slotted portion of each runner a knife 29, is located. The knife occupies practically a horizontal position, and is provided with an angular shank 30; and the attachment between the runners and the knives is effected by passing bolts 31, provided with suitable nuts, through the vertical members of the knife shanks and through the slots 28 in the runners. The knives at their outer extremities are decidedly curved upward, and the forward edges of the knives are their cutting edges, the knives being also curved downward from their backs in direction of their cutting edges.

The knives do not stand at a right angle to the runners but at an acute angle thereto, as shown in Fig. 2, having a decided rearward inclination. These knives are adapted to cut the weeds at each side of the row of corn under cultivation, and also to direct the loose ground in direction of the runners.

The ridges that are located at each side of a row of listed corn are torn down or broken up through the medium of shovels 32. These shovels are adapted to have both lateral and vertical adjustment in order that they may be made to cut either deep or shallow, or a predetermined distance away from the runners. To that end each shovel is provided with an upwardly-extending shank 33, and this shank is preferably made flat upon opposite sides and is threaded upon its other two sides. The shanks of the shovels are passed upward through longitudinal slots 34, produced in the straight or horizontal members 24ª of the cross head 24, and are held in an adjusted position through the medium of lock nuts, one nut being located above the other below the cross head.

At each extremity of the cross head a slotted segmental guide 34ª, is located, the convexed edge whereof faces the front, and these guides, as shown in detail in Fig. 4, are preferably made integral with the ends of the cross head and stand more or less vertically and in advance of the forward edge of said cross head. These guides are adapted for use in connection with arms 35, the arms being pivotally attached at their rear ends to the end portion of the cross-head, and by means of bolts 35ª, which are passed through the segmental arms 34ª, the arms may be adjusted in a horizontal, or an upwardly or downwardly inclined position. The arms are not straight, as after they have passed the segmental guides 34ª they are bent or carried inward and then carried straight in a forward direction. Each arm 35, has journaled at its forward end a balance roller 36, and these rollers are adapted to travel upon the ridges acted upon by the shovels and are also adapted to assist in maintaining a proper equilibrium of the machine.

Thus in the operation of the machine it is evident that the runners may be adjusted and operated in connection with rows of corn of different width; and furthermore that the knives 29, may be adjusted in direction of the front or rear of the machine, and in operation as the machine advances the young plants are protected by the runners while the shovels break up the ridges at the sides of the rows, and the knives cut the weeds and direct the loose dirt in direction of the runners and consequently in direction of the rows under treatment; while the balance wheels 36, serve as guides for the machine, and likewise, as has heretofore been stated, serve to preserve its equilibrium.

It is often desirable that a machine of the character described should be drawn by a single horse, and to provide for such an emergency the shafts 40 in which the horse is to be harnessed, are provided with angular and downwardly-extending pins 41, which are removably entered into sockets 42, produced preferably upon the left-hand section of the cross head 24, as shown in both Figs. 2 and 3, the sockets being clearly shown in Fig. 4; and when a pair of shafts is used in connection with the machine, a chain or cable 43, is usually attached to the right hand member of the shaft and to the right hand extremity of the cross head, as shown in Fig. 2.

Having thus described my invention, I claim as new and desire to secure by Letters Patent—

1. In a cultivator, the combination, with runners and arches connecting the same, of a cross head carried by the forward arch, shovels adjustably located upon the outer portions of the cross head, and balance rollers adjustably connected with the cross head adjacent to the shovels, as and for the purpose set forth.

2. In a cultivator, the combination, with runners adjustably connected and knives adjustably connected with the runners, the knives extending horizontally outwardly and rearwardly from the runners, the outer extremities of the knives being upwardly curved and given a transversely downward inclination in direction of their cutting edges, of a cross head, and shovels vertically and laterally adjustable upon the cross head near the extremities thereof, as and for the purpose specified.

3. In a cultivator, the combination, with runners having an adjustable attachment, and a cross head connected with the forward adjustment of the runners, the said cross head being provided with slots near its outer extremities, of shovels the shanks of which are passed upward through the slots in the cross head and adjustably connected with the latter, a guide arm carried by the cross head at its extremities, an arm fitted to the cross head and having adjustable connection with the guide arm, and balance rollers carried by the said arms, the rollers being located in advance of the shovels, as and for the purpose set forth.

4. In a cultivator, the combination, with runners having an adjustable attachment, and a cross head connected with the forward adjustment of the runners, the said cross head being provided with slots near its outer extremities, of shovels the shanks of which are passed upward through the slots in the cross head and adjustably connected with the latter, a guide arm carried by the cross head at its extremities, an arm pivoted to the cross head and having adjustable connection with the guide arm, balance rollers carried by the said arms, the rollers being located in advance of the shovels, and knives adjustably connected with the runners back of the shovels, the said knives being curved upwardly at their outer ends and given a downwardly transverse inclination in direction of their cutting edges, substantially as and for the purpose specified.

HENRY EASTMAN.

Witnesses:
JACOB ANDERSON,
ANTON A. PETERSON.